United States Patent
Ranganathan et al.

(10) Patent No.: US 7,349,828 B1
(45) Date of Patent: Mar. 25, 2008

(54) ESTIMATING AN ELECTRONIC DEVICE CONDITION

(75) Inventors: Parthasarathy Ranganathan, Fremont, CA (US); Khaldoun Alzien, Houston, TX (US); Phillip Leech, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 59 days.

(21) Appl. No.: 11/354,446

(22) Filed: Feb. 15, 2006

(51) Int. Cl.
*G06F 19/00* (2006.01)
*G06F 1/00* (2006.01)

(52) U.S. Cl. ............... 702/186; 340/500; 340/635; 340/653; 702/182; 713/300; 713/320; 713/323

(58) Field of Classification Search ............ 73/112; 340/500, 635, 653, 679; 700/90, 108; 702/127, 702/182, 186; 705/7, 8, 9; 713/300, 320, 713/322, 323, 324, 330
See application file for complete search history.

(56) References Cited

U.S. PATENT DOCUMENTS

| | | | | |
|---|---|---|---|---|
| 5,422,806 A * | 6/1995 | Chen et al. | ............... | 700/29 |
| 5,481,210 A * | 1/1996 | Genzel | ............... | 326/93 |
| 5,563,928 A * | 10/1996 | Rostoker et al. | ............... | 377/20 |
| 5,795,068 A * | 8/1998 | Conn, Jr. | ............... | 374/170 |
| 6,067,508 A * | 5/2000 | Conn, Jr. | ............... | 702/132 |
| 6,125,334 A * | 9/2000 | Hurd | ............... | 702/60 |
| 6,205,555 B1 * | 3/2001 | Kageshima et al. | ............... | 713/300 |
| 6,564,328 B1 * | 5/2003 | Grochowski et al. | ............... | 713/320 |
| 6,848,054 B1 * | 1/2005 | Watts, Jr. | ............... | 713/300 |
| 7,051,300 B1 * | 5/2006 | Shen et al. | ............... | 716/4 |
| 7,194,646 B1 * | 3/2007 | Watts, Jr. | ............... | 713/322 |
| 2002/0138159 A1 * | 9/2002 | Atkinson | ............... | 700/21 |
| 2005/0120254 A1 * | 6/2005 | Suzuoki et al. | ............... | 713/320 |
| 2005/0171753 A1 * | 8/2005 | Rosing et al. | ............... | 703/18 |
| 2007/0159202 A1 * | 7/2007 | Noel et al. | ............... | 324/765 |
| 2007/0220292 A1 * | 9/2007 | Ishihara et al. | ............... | 713/320 |
| 2007/0240003 A1 * | 10/2007 | Watts, Jr. | ............... | 713/322 |

\* cited by examiner

*Primary Examiner*—Edward R Cosimano

(57) ABSTRACT

In a method for estimating a condition of an electronic device, a model correlating at least one utilization metric of a component of the electronic device and the condition of the component to be estimated is formulated. In addition, the at least one utilization metric of the component is detected and the condition of the component and the electronic device are estimated based upon the formulated model with the detected at least one utilization metric as an input to the formulated model.

20 Claims, 7 Drawing Sheets

ESTIMATING AN ELECTRONIC DEVICE CONDITION

BACKGROUND

Blade servers (or blade PCs) represent a fast growing segment in the computing industry because of the compaction, consolidation, modularity, management, and maintenance afforded by the blade servers. The growth in the use of blade servers has, however, led to ever increasing challenges in efficiently powering and cooling the blade servers. The challenges include attempts at minimizing the relatively high operational capital and recurring costs associated with enterprise environments having a relatively large number of blade servers.

It is often beneficial to monitor the power consumption levels of the blade servers to thereby track the costs associated with operating the blade servers. The power consumption levels of the blade servers are typically monitored through the use of hardware, such as, current monitors. The use of conventional hardware to monitor blade server energy usage is typically results in relatively high costs. In addition, it is often relatively difficult to integrate conventional energy monitoring hardware with legacy systems.

The ability to monitor power consumption levels of blade servers as well as other electronic devices, such that the costs and difficulties associated with monitoring the power consumptions levels are substantially minimized, would therefore be beneficial.

SUMMARY

A method for estimating a condition of an electronic device is disclosed. In the method, a model correlating at least one utilization metric of a component of the electronic device and the condition of the component to be estimated is formulated. In addition, the at least one utilization metric of the component is detected and the condition of the component and the electronic device are estimated based upon the formulated model with the detected at least one utilization metric as an input to the formulated model.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

As described in greater detail herein below, systems and methods are provided for estimating at least one condition of an electronic device through software. In other words, the at least one condition may be estimated without requiring that additional hardware be implemented to detect the at least one condition. As such, for instance, the systems and methods disclosed herein allow for lower-cost monitoring of power consumption as compared with conventional power monitoring techniques because they avoid the requirement of additional hardware. The systems and methods disclosed herein are also suitable for use on legacy systems because they do not require the installation of additional hardware.

Figure 1A:
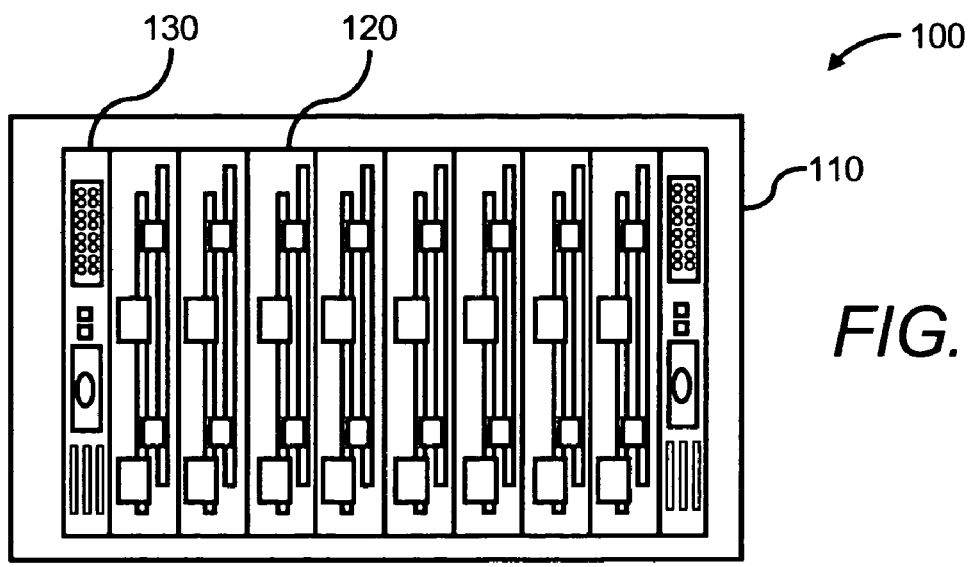
FIG. 1A shows a simplified frontal view of an electronic environment in which various embodiments of the invention may be practiced, according to an embodiment of the invention.

With reference first to FIG. 1A, there is shown a simplified frontal view of an electronic environment 100 in which various embodiments of the invention may be practiced. The electronic environment 100 depicted in FIG. 1A generally comprises an enclosure 110 housing a number of electronic devices 120, such as, computer systems, servers, memories, hard drives, etc. In FIG. 1A, however, the electronic devices 120 are depicted as comprising blade PCs arranged in horizontal alignment with respect to each other in the enclosure 110. The electronic devices 120 are also depicted as including various components generally known to form part of conventional electronic systems, such as, various connectors, buttons, indicators, etc.

In addition to the electronic devices 120, the enclosure 110 may include other components, such as, interconnects 130. The interconnects 130 generally operate to route network signals from the electronic systems 120. Two interconnects 130 may be provided to provide redundancy for the electronic systems 120.

Although eight electronic systems 120 and two interconnects 130 have been illustrated as being contained in the enclosure 110, any reasonably suitable number of electronic systems 120 and interconnects 130 may be included in the enclosure without departing from a scope of the invention. In addition, the electronic environment 100 may include additional components and some of the components depicted may be removed and/or modified without departing from a scope of the electronic environment 100.

It should also be understood that various embodiments of the invention may be practiced in electronic environments having different configurations than the electronic environment 100 depicted in FIG. 1A. By way of example, various embodiments of the invention may be practiced in electronic environments having different types of electronic devices 120, for instance, in electronic environments having horizontally arranged servers, standalone servers, computers, hard drives, etc. In addition, or alternatively, various embodiments of the invention may be practiced in a larger scale computing environment in comparison with the electronic environment 100 depicted in FIG. 1A.

Figure 1B:
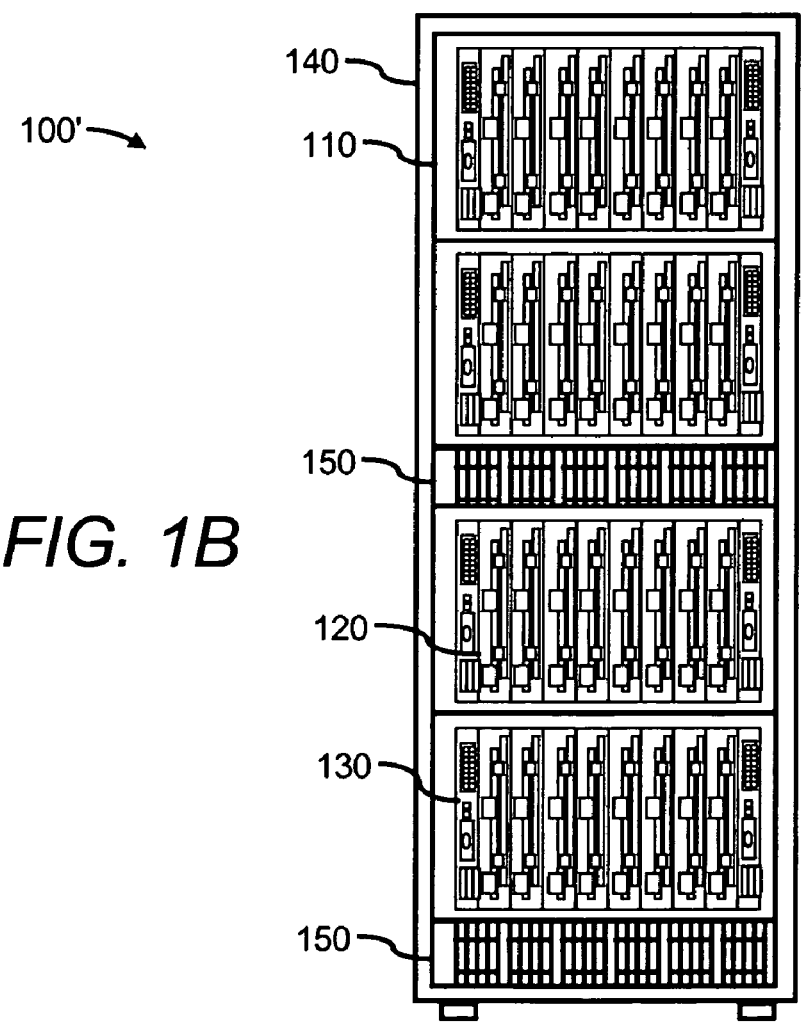
FIG. 1B shows illustrates a simplified frontal view of another electronic environment in which various embodiments of the invention may be practiced, according to an embodiment of the invention.

An example of a larger scale electronic environment 100' is depicted in FIG. 1B. More particularly, FIG. 1B illustrates a simplified frontal view of a rack 140, such as, an electronics cabinet, housing four enclosures 110. The rack 140 is also depicted as including two sets of power supplies 150. The rack 140 may, however, house any reasonably suitable number of enclosures 110, such as, six, eight, or more, as well as any reasonably suitable number of power supplies 150. In addition, the enclosures 110 included in the rack 140 may also house any reasonably suitable number of electronic devices 120.

Various embodiments of the invention may further be practiced in electronic environments containing a relatively larger number of electronic devices 120 than are depicted in FIG. 1B. For instance, various embodiments of the invention may be practiced amongst electronic devices 120 contained in a data center or electronic devices 120 positioned at different geographic locations with respect to each other. The different geographic locations may include, for instance, different rooms, different buildings, different counties, different countries, etc.

Figure 2A:
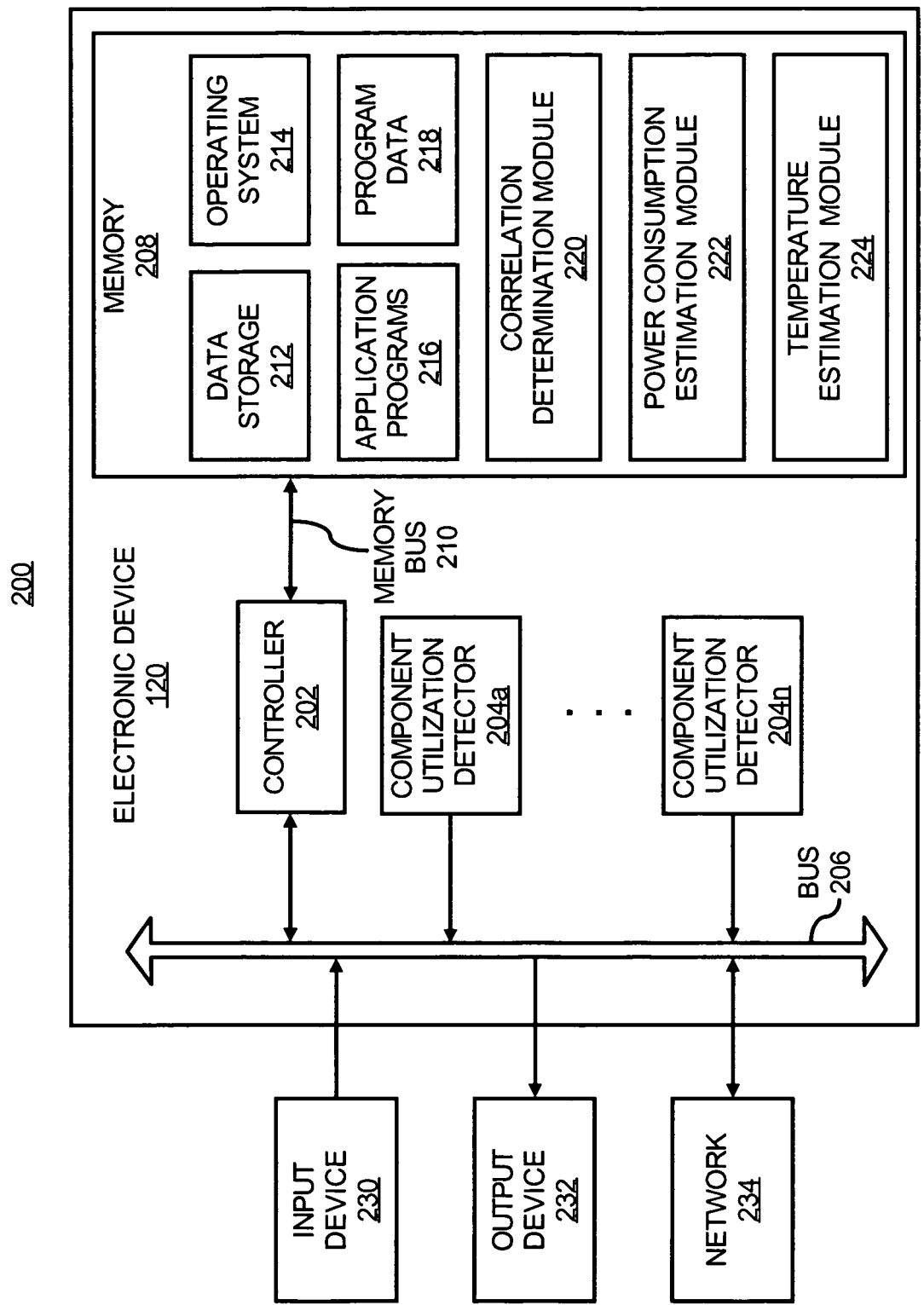
FIG. 2A illustrates a block diagram of a condition estimation system, according to an embodiment of the invention.

With reference now to FIG. 2A, there is shown a block diagram of a condition estimation system 200 according to an example. It should be understood that the following description of the condition estimation system 200 is but one manner of a variety of different manners in which such a condition estimation system 200 may be operated. In addition, it should be understood that the condition estimation system 200 may include additional components and that some of the components described may be removed and/or modified without departing from a scope of the condition estimation system 200.

The following description of the condition estimation system 200 makes specific reference to the elements depicted in the electronic environments 100, 100'. It should, however, be understood that the condition estimation system 200 may be implemented in environments that differ from those environments 100, 100' depicted in FIGS. 1A and 1B, as described above.

The condition estimation system 200 is depicted in FIG. 2A as being implemented in an electronic device 120. In this example, the electronic device 120 is configured with software configured to estimate a condition, such as, the power consumption level or the temperature, of the electronic device 120, as described in greater detail herein below.

As shown, the electronic device 120 includes a controller 202 configured to perform various processing operations in the electronic device 120. In one regard, the controller 202 may comprise a microprocessor, a micro-controller, an application specific integrated circuit (ASIC), and the like, configured to perform the various power estimation operations described herein. The controller 202 may also be configured to perform other processing tasks, such as, the performance of other applications performed by known electronic devices.

The controller 202 is depicted as receiving information from a plurality of component utilization detectors 204a-204n, where "n" is an integer equal to or greater than 1, through a bus 206. Although a plurality of component utilization detectors 204a-204n have been depicted in FIG. 2A, it should be understood that the electronic device 120 may include a single component utilization detector 204a without departing from a scope of the electronic device 120 disclosed herein.

The component utilization detectors 204a-204n may comprise at least one of software and hardware configured to detect utilization metrics of one or more electronic device 120 components. The electronic device 120 components may include, for instance, the controller 202, a memory 208 of the electronic device 120, a disk drive (not shown) of the electronic device 120, a network traffic monitor (not shown), etc. In addition, the component utilization detectors 204a-204n generally comprise at least one of software and hardware that is originally supplied with the electronic device 120 for the purpose of detecting utilization metrics of the electronic device 120 components. As described below, the utilization metrics detected by the component utilization detectors 204a-204n may vary according to the type of component the component utilization detectors 204a-204n are configured to detect. Furthermore, the component utilization detectors 204a-204n may be configured to detect the utilization metrics once, at various intervals of time, substantially continuously, etc.

In one example, the electronic device 120 component may comprise the controller 202. In this example, a component utilization detector 204a may be configured to detect a utilization metric of the controller 202. More particularly, for instance, the component utilization detector 204a may be configured to detect the load on and/or work performed by the controller 202. In addition, the component utilization detector 204a may comprise any reasonably suitable commercially available device or software capable of detecting the load on and/or work performed by the controller 202.

In another example, the electronic device 120 component may comprise the memory 208, and a component utilization detector 204b may be configured to detect a utilization metric of the memory 208. More particularly, the component utilization detector 204b may be configured to detect, for instance, a speed at which a disk of the memory 208 is spinning, a duration of time and level at which the memory 208 is operating, the rates at which data is transferred to and from the memory 208, etc. In addition, the component utilization detector 204b may comprise any reasonably suitable commercially available device or software capable of detecting a utilization metric of the memory 208.

The detected utilization metrics of one or more of the electronic device 120 components may be communicated to the controller 202 through the bus 206. In addition, the controller 202 may store the information collected from one or more of the component utilization monitors 204a-204n in the memory 208. For instance, the collected information may be communicated to the memory 208 through a memory bus 210 and may be stored in a data storage 212 of the memory 208.

Generally speaking, the memory 208 may be configured to provide storage of software, algorithms, and the like, that provide the functionality of the controller 202. By way of example, the memory 208 may store an operating system 214, application programs 216, program data 218, and the like. In this regard, the memory 208 may be implemented as a combination of volatile and non-volatile memory, such as DRAM, EEPROM, MRAM, flash memory, and the like. In addition, or alternatively, the memory 208 may comprise a device configured to read from and write to a removable media, such as, a floppy disk, a CD-ROM, a DVD-ROM, or other optical or magnetic media.

The memory 208 is also depicted as storing a correlation determination module 220 and a power consumption estimation module 222. The controller 202 may implement the modules 220 and 222 in estimating a power consumption level of the electronic device 120. Also shown in the memory 208 is a temperature estimation module 224, which the controller 202 may implement in estimating a temperature of the electronic device 120. Some or all of the modules 220-224 may comprise software which the controller 202 may implement. In addition, or alternatively, some or all of the modules 220-224 may comprise one or more hardware devices that may be controlled by the controller 202.

The controller 202 may implement the correlation determination module 220 to formulate models of the correlations between the condition to be estimated and the utilization metrics received from the component utilization detectors 204a-204n. In one example, the models may be based upon testing or component manufacturer supplied information to determine the actual conditions based upon various utilization metric levels. In this example, the correlations may be viewed graphically to determine trends in the correlations between the conditions and the utilization metric levels. An example of the variation of power consumption with varying load on the controller 202 for a plurality of different voltage levels is depicted in FIG. 3A.

Figure 3A:
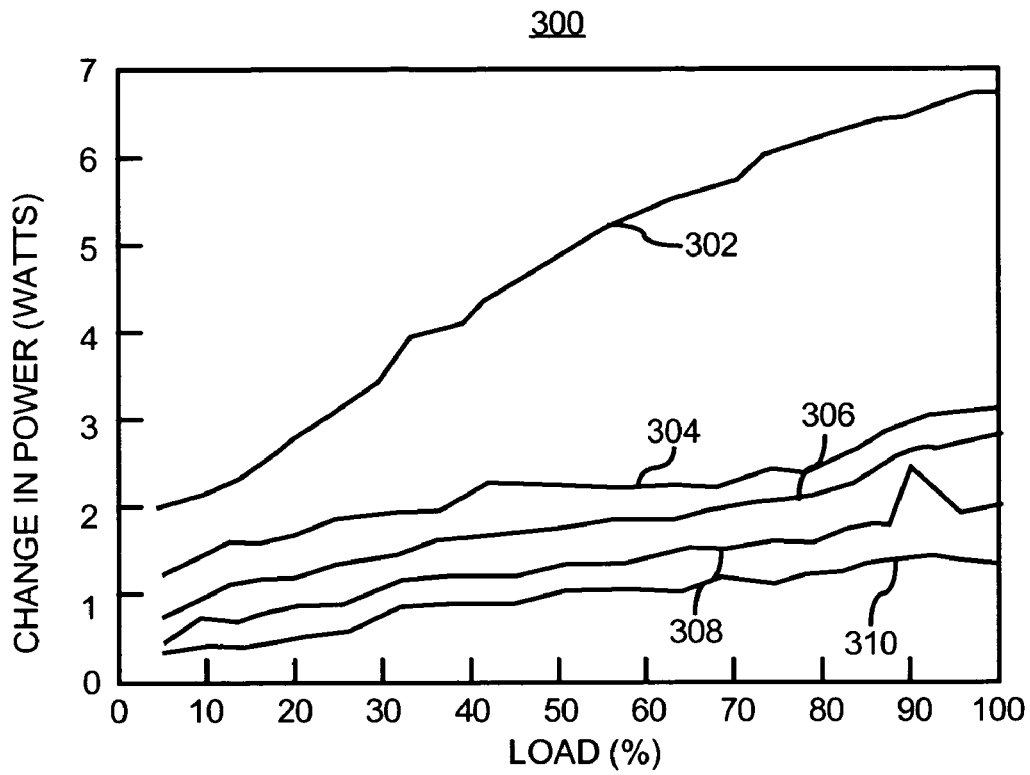
FIGS. 3A-3D illustrate respective graphs depicting various relationships between detected utilization metrics and power consumption levels.

More particularly, FIG. 3A depicts a graph 300 illustrating the relationship between the power consumption level of the controller 202 and the load on the controller 202 for five voltage levels 302-310. As shown, the correlations between the power consumption levels and the loads on the controller 202 vary for the varying voltage levels of the controller 202. In addition, the graph 300 generally depicts trends in the correlations between the power consumption levels and the loads for the different voltage levels 302-310. The trends in the correlations may be used as the basis for formalizing models that use the load on the controller 202 as a first-order proxy for the total power consumption of the electronic device 120. More particularly, for instance, the controller 202 may implement the correlation determination module 220 to create a model based upon these trends. By way of example, for instance, an illustrative piece-wise linear model that summarizes FIG. 3A is given by the following model:

if (state==0) {power=1.0;} else if (state==1) {power=0.005*(new_util)+1.0;} else if (state==2) {power=0.015*(new_util)+1.0;} else if (state==3) {power=0.03*(new_util)+1.0;} else if (state ~4) {power=0.052*(new_util)+1.8;}.

In the model above, the states (0-4) correspond to the voltage levels 302-310. In addition, "new_util" is the utilization metric detected by a component utilization detector 204a. The model depicted above therefore provides a relatively quick and accurate manner of correlating power consumption levels to detected utilization metrics, which may be implemented through software by the controller 202.

Figure 3B:
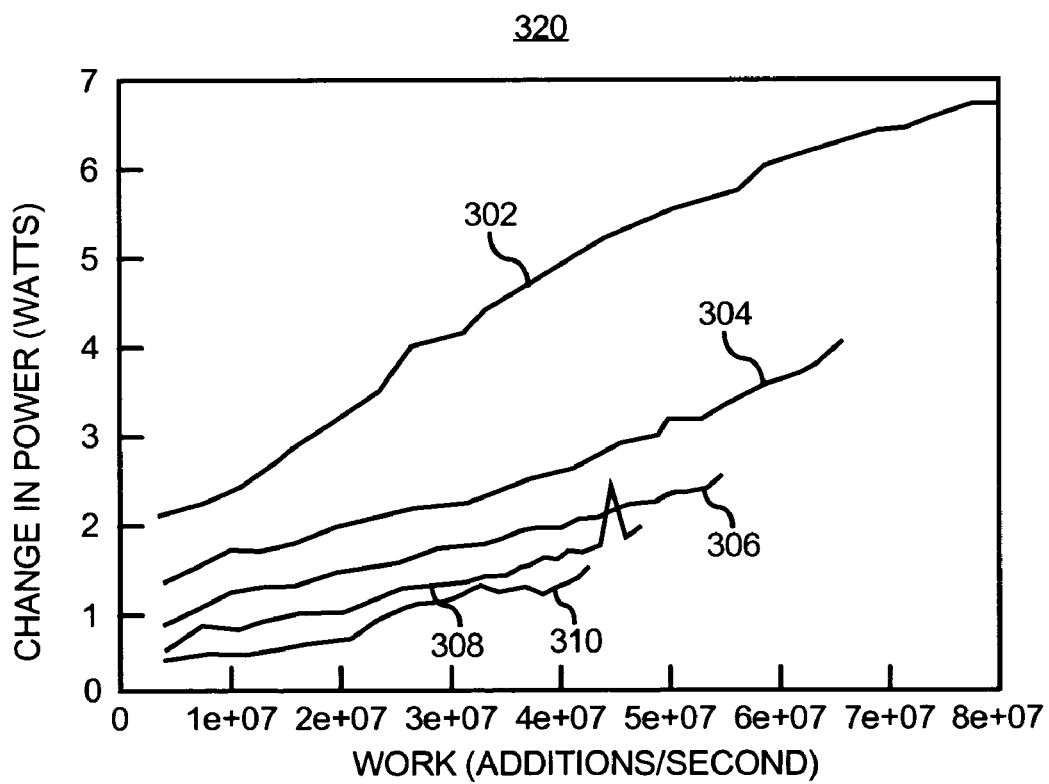

FIG. 3B depicts a graph 320 illustrating the relationship between the power consumption level of the controller 202 and the work performed, in additions per second, by the controller 202 for the five voltage levels 302-310. The utilization metric in FIG. 3B may thus comprise the work performed by the controller 202. As with the graph 300 depicted in FIG. 3A, the controller 202 may implement the correlation determination module 220 to create a model based upon the trends depicted in FIG. 3B.

Figure 3C:
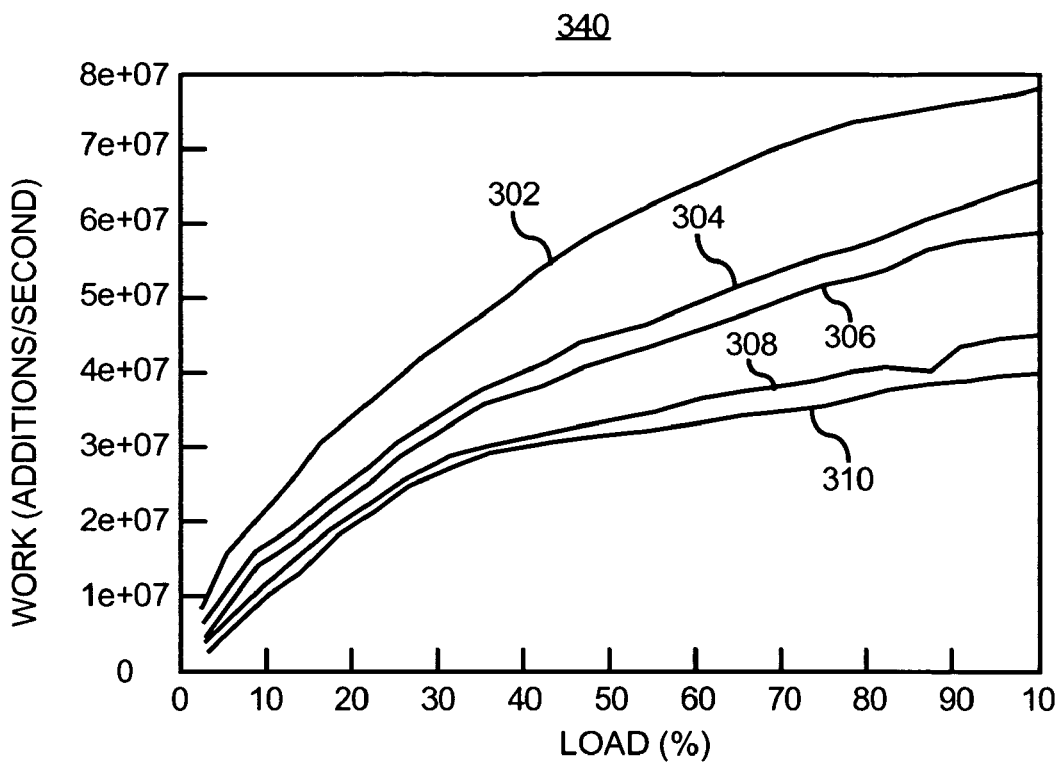

In addition, FIG. 3C depicts a graph 340 illustrating a relationship between the work performed by the controller 202 and the load on the controller 202, for the five voltage levels 302-310. The relationships depicted in the graph 340 may be employed, for instance, if the utilization metric detected by a component utilization monitor 204a is configured to detect the load on the controller 202 and the correlations in the graph 320 are available. As such, for example, the load may be correlated to the work performed by the controller 202, which may then be correlated to the power consumption level of the controller 202.

Figure 3D:
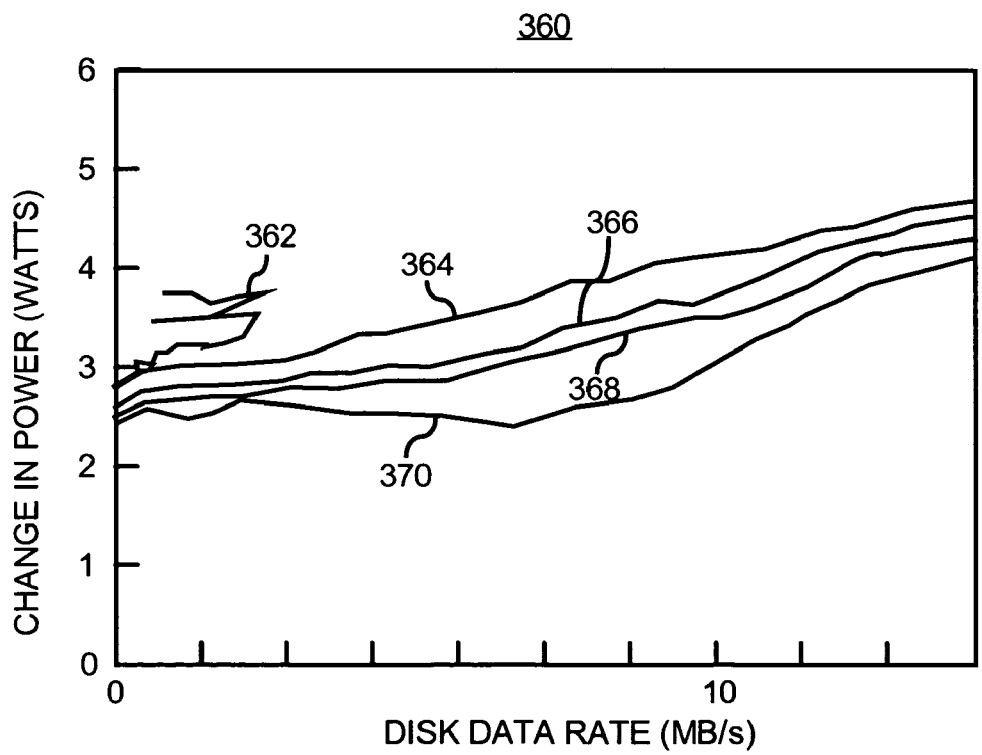

As another example, FIG. 3D depicts a graph 360 illustrating a relationship between the power consumption level of a disk drive and the disk data rate for five varying block sizes 362-370. The utilization metric in the correlation depicted in FIG. 3D may thus comprise the disk data rate of, for instance, the memory 208. In addition, the controller 202 may implement the correlation determination module 220 to create a model based upon the trends between the disk data rates and the power consumption levels for the varying block sizes 362-370 in manners similar to those described above with respect to FIG. 3A.

It should be understood that the correlations depicted in the graphs 300, 320, 340, and 360 have been provided for illustrative purposes only and are not meant to limit the present invention in any respect. In addition, although the graphs 300, 320, and 360 have been depicted as correlating a utilization metric with power, various other graphs depicting correlations between utilization metrics and temperature may also be produced in similar manners. Moreover, the controller 202 may implement the correlation determination module 220 to create models based upon trends between the utilization metrics and the temperature in manners similar to those described above with respect to FIG. 3A.

With regard to estimating the power consumption level of the electronic device 120, the controller 202 may implement the power consumption estimation module 222 to compare the collected component utilization metric information, such as, the load on and/or the work performed by the controller 202 to the power consumption level of the controller 202, as described herein above with respect to FIGS. 3A-3C. The models correlating the component utilization levels and the component power consumption levels may, for instance, be stored in the data storage 212 of the memory 208. In this regard, for instance, the controller 202 may implement the power consumption estimation module 222 to access and process the correlation information stored in the data storage 212, which may be stored in the data storage 212.

The controller 202 may use the models correlating the utilization metric levels and the power consumption levels to estimate the power consumption level of the electronic device 120. More particularly, for instance, the controller 202 may implement the power consumption estimation module 222 to estimate the power consumption levels of one or more of the components of the electronic device 120 based upon the models. In other words, the controller 202 may input the detected utilization metrics into the power consumption estimation module 222, which may use the models to output the power consumption levels. In addition, the controller 202 may aggregate the estimated power consumption levels of the one or more components to estimate the power consumption level of the electronic device 120.

The controller 202 may also implement the temperature estimation module 224 to estimate the electronic device 120 temperature. More particularly, for instance, the controller 202 may implement the temperature estimation module 224 to extrapolate potential heat dissipation of a component from a model correlating the detected utilization metric and the power consumption level of one or more components of the electronic device 120. The model correlating the detected utilization metric and the temperature level may be produced, for instance, as described herein above with respect to FIG. 3D and may also be stored in the data storage 212.

Moreover, the controller 202 may input the detected utilization metrics into the temperature estimation module 224, which may use the models to output the estimated temperature levels. In addition, the controller 202 may aggregate the estimated temperatures of the one or more components to estimate a total temperature of the electronic device 120.

Although the power consumption estimation module 222 has also been illustrated in FIG. 2A, it should be understood that the power consumption estimation module 222 may be considered optional, for instance, in situations where an estimate of the power consumption level is not desired. Thus, it should be understood that the controller 202 may be implemented to estimate either or both of the electronic device 120 power consumption level and temperature.

The controller 202 may receive input from a user through an input device 230, such as, a keyboard, a touchpad, a mouse, a pen, a disk drive, etc. As shown, inputs from the input device 230 may be communicated to the controller 202 through the bus 206. A user may, for instance, use the input device 230 to store correlation information in the data storage 212, to initiate an electronic device 120 power consumption estimation process, to initiate an electronic device 120 temperature estimation process, etc.

The controller 202 may further output information through an output device 232, such as, a monitor, a printer, a disk drive, an external memory, etc. As shown, outputs from the controller 202 may be communicated to the output device 232 through the bus 206. In addition, outputs such as the estimated power consumption level of the electronic device 120, the estimated temperature of the electronic device 120, etc., may be communicated through implementation of the output device 232. In addition, or alternatively, the information communicated through the output device 232 may also be communicated over a network 234, such that the information may be communicated to, for instance, another electronic device 120. In this regard, the network 234 may comprise a local area network, the Internet, and the like. Although not shown, the controller 202 may be equipped with or have access to software and/or hardware to enable the controller 202 to transmit and receive data over the network 234.

In one example, the controller 202 may transmit information pertaining to one or both of the estimated power consumption level and the temperature of the electronic device 120 to a computing device (not shown) configured to, for instance, collect and aggregate this information from a plurality of electronic devices 120. Thus, for instance, this information may be employed by the computing device to calculate one or both of power consumption levels and temperatures of, for instance, the electronic devices 120 located in an enclosure 110, a rack 140, a plurality of racks 140, etc.

Figure 2B:
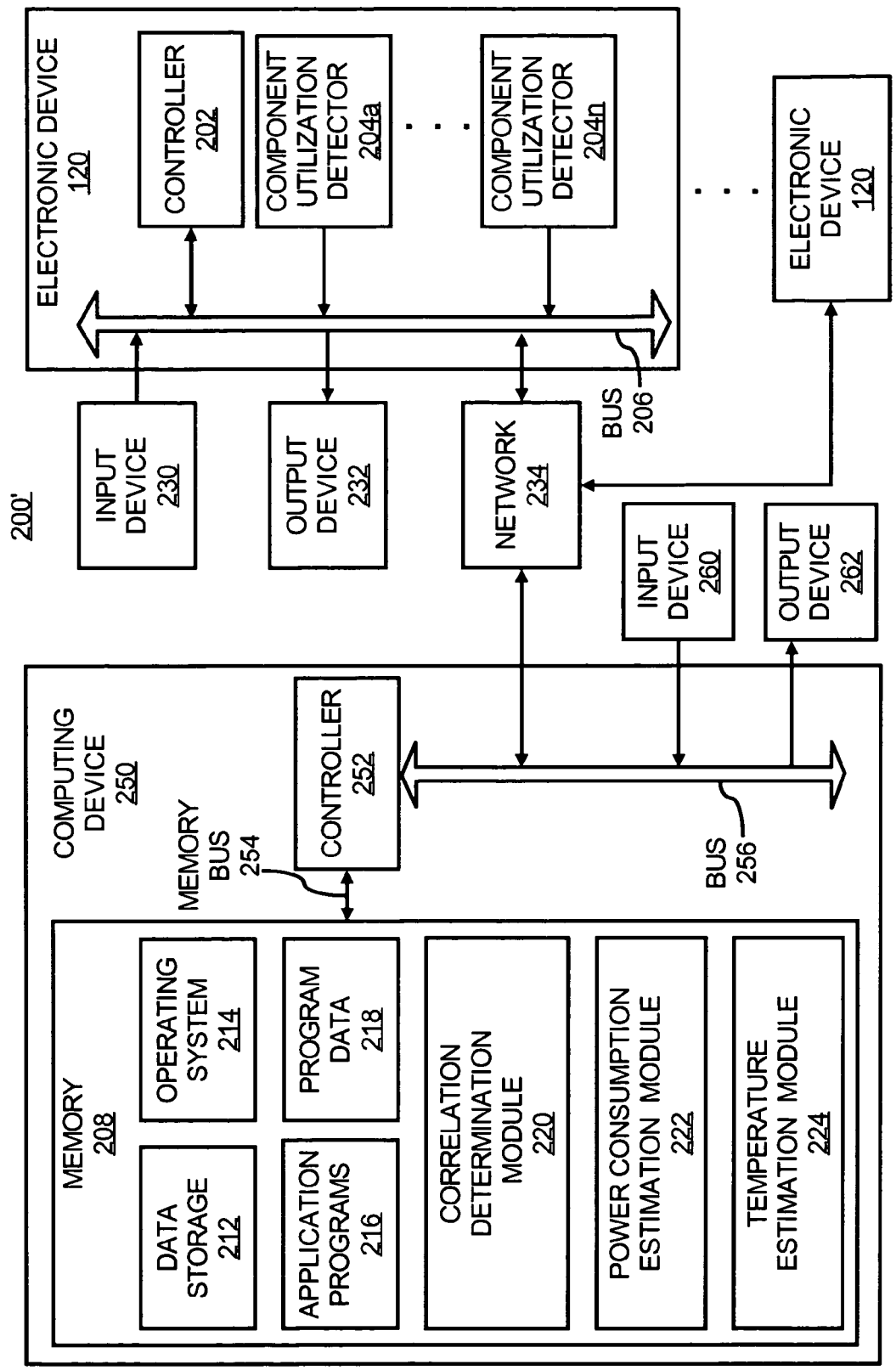
FIG. 2B illustrates a block diagram of a condition estimation system, according to another embodiment of the invention.

With reference now to FIG. 2B, there is shown a block diagram of a condition estimation system 200' according to another example. It should be understood that the following description of the condition estimation system 200' is but one manner of a variety of different manners in which such a condition estimation system 200' may be operated. In addition, it should be understood that the condition estimation system 200' may include additional components and that some of the components described may be removed and/or modified without departing from a scope of the condition estimation system 200'.

The condition estimation system 200' depicted in FIG. 2B includes all of the elements of the condition estimation system 200 depicted in FIG. 2A. As such, except as otherwise indicated, the description of the common elements provided above with respect to FIG. 2A is suitable for the features depicted in FIG. 2B. Accordingly, only those features that differ in the condition estimation system 200' depicted in FIG. 2B and the condition estimation system 200 depicted in FIG. 2A will be described herein with respect to FIG. 2B.

One of the differences between the two systems 200 and 200' is the location of the computing device configured to estimate one or both of the power consumption level and the temperature. As described above, in the condition estimation system 200 depicted in FIG. 2A, a condition is estimated by the controller 202 of the electronic device 120 for which the condition is being estimated. However, in the condition estimation system 200' depicted in FIG. 2B, the condition estimation is performed by a computing device 250 separate from the electronic device 120.

In addition, the computing device 250 may be configured to estimate one or both of the power consumption levels and temperatures of one or more electronic devices 120, as also shown in FIG. 2B. As such, for instance, the computing device 250 may estimate one or more conditions of the electronic devices 120 located in an enclosure 110, a rack 140, a row of racks 140, a data center, etc.

With particular reference back to FIG. 2B, the computing device 250 is depicted as including a controller 252, a memory bus 254 and a bus 256. As shown, the computing device 250 may communicate with one or more electronic devices 120 through the network 234. More particularly, for instance, the controller 202 of the electronic device 120 may transmit utilization metric data detected and monitored by the component utilization detectors 204a-204n to the controller 252 through the network 234 and the bus 256. In addition, the controller 252 may transmit the utilization metric data to the memory 208 through the memory bus 254 and the data may be stored in the data storage 212 as described above.

The controller 252 of the computing device 250 may implement one or more of the modules 220-224 as described herein above with respect to the controller 202 to estimate one or both of the power consumption level and temperature of the electronic device 120. In addition, the computing device 250 may receive utilization metric data from at least one other electronic device 120 and may estimate one or both of the power consumption level and temperature of the at least one other electronic device 120. The computing device 250 may, moreover, aggregate the estimations to formulate a relatively larger scale estimation of one or both of the power consumption levels and temperatures for a group of electronic devices 120.

The controller 252 of the computing device 250 may also receive input from an input device 260, which may be similar to input device 230 described above. In addition, the controller 252 may output information through an output device 262, which may be similar to the output device 232. Although not shown, the controller 202 may be equipped with or have access to software and/or hardware to enable the controller 202 to transmit and receive data over the network 234.

Figure 4:
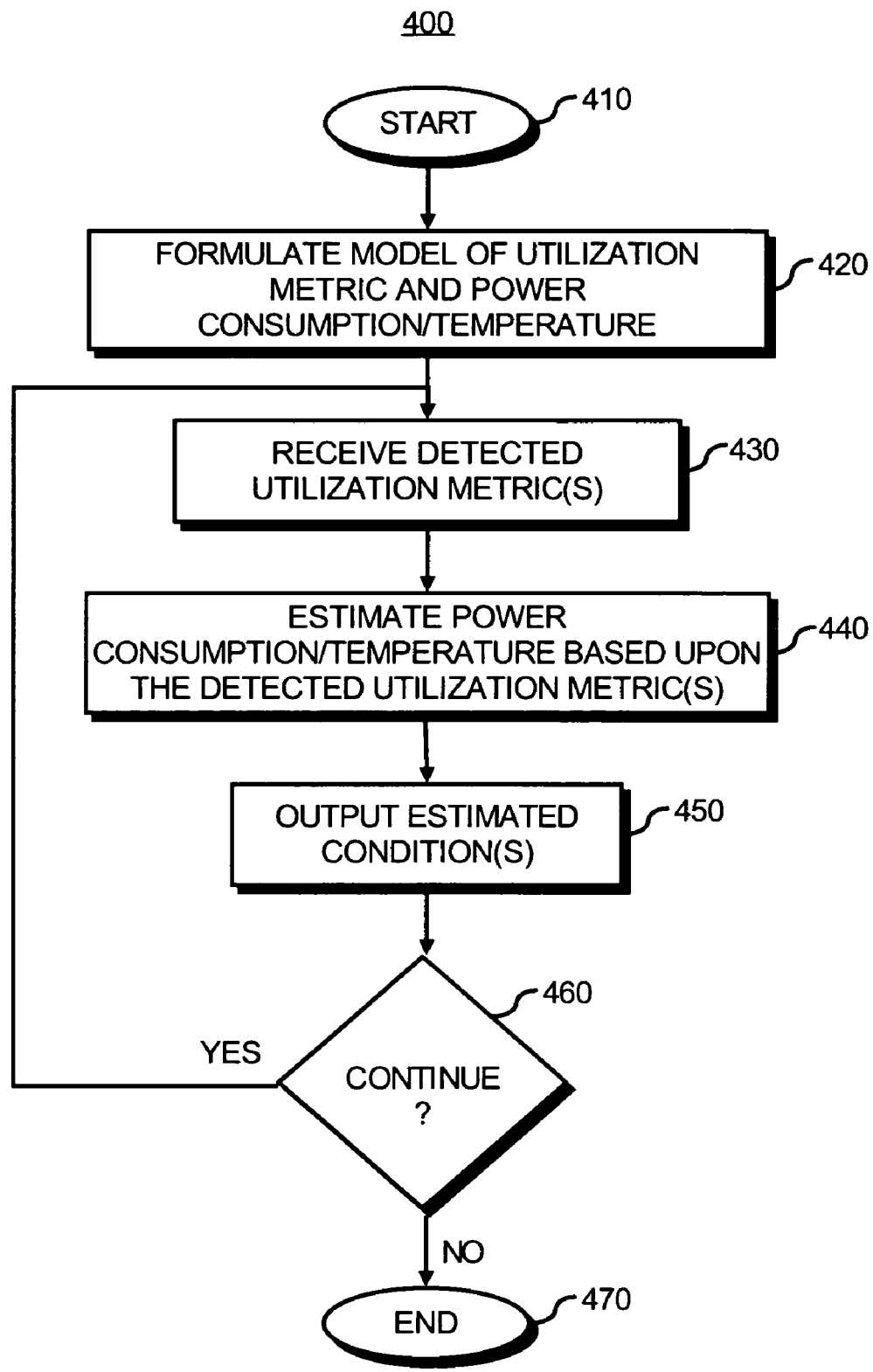
FIG. 4 depicts a flow diagram of a method for estimating a condition of an electronic device, according to an embodiment of the invention.

Turning now to FIG. 4, there is shown a flow diagram of a method 400 for estimating a condition of an electronic device 120, according to an example. It is to be understood that the following description of the method 400 is but one manner of a variety of different manners in which an example of the invention may be practiced. It should also be apparent to those of ordinary skill in the art that the method 400 represents a generalized illustration and that other steps may be added or existing steps may be removed, modified or rearranged without departing from a scope of the method 400.

The description of the method 400 is made with reference to the condition estimation systems 200, 200' illustrated in FIGS. 2A and 2B, and thus makes reference to the elements cited therein. It should, however, be understood that the method 400 is not limited to the elements set forth in the condition estimation systems 200, 200'. Instead, it should be understood that the method 400 may be practiced by a system having a different configuration than that set forth in the condition estimation systems 200, 200'.

The method 400 may be initiated at step 410 in response to any of a number of stimuli or conditions. For instance, the method 400 may be initiated with activation of the components in the electronic device 120. In addition, or alternatively, the method 400 may be manually initiated or the controller 202 may be programmed to initiate the method 400 at various times, for a set duration of time, substantially continuously, etc.

At step 420, the controller 202, 252 may implement the correlation determination module 220 to formulate a model correlating one or more utilization metrics and power consumption levels for one or more components. In addition, or alternatively, the controller 202, 252 may implement the correlation determination module 220 to formulate a model correlating one or more utilization metrics and temperatures for one or more components. In any regard, the models may be formulated in the manners described above with respect to FIGS. 3A-3D and may be stored in the data storage 212 of the memory 208.

At step 430, the controller 202, 252 may receive one or more utilization metrics detected by the component utilization detectors 204a-204n. At step 440, as described above, the controller 202, 252 may estimate the power consumption level(s) of the component(s) for which the one or more utilization metrics were received, as well as the power consumption level of the electronic device 120, based upon the formulated models. In addition, or alternatively, the controller 202, 252 may estimate the temperature(s) of the component(s) for which the one or more utilization metrics were received, as well as the temperature of the electronic device 120, based upon the formulated models, as also described herein above.

Moreover, at step 440, the controller 202, 252 may estimate the condition of the electronic device 120 based upon a correlation with the estimated condition(s) of the component(s). If the condition of a single component is estimated, the estimated condition of the component may be used as a basis for estimating the condition of the electronic device 120. By way of example, the condition of the electronic device 120 may be estimated as comprising a predetermined relationship with the estimated condition of the component. In this regard, for instance, a predetermined factor may be added, multiplied, subtracted, etc., from the estimated condition of the component to estimate the condition of the electronic device 120.

If multiple conditions of multiple components are estimated, the estimated conditions may be used a basis for estimating the condition of the electronic device 120. For instance, the estimated conditions of the multiple components may be summed, with the sum being used as the estimated condition of the electronic device 120. In addition, or alternatively, the multiple estimated conditions may be weighted by predetermined factors, such that one or more of the estimated conditions affect the condition of the electronic device 120 to a greater extent than others of the conditions.

At step 450, the controller 202, 252 may output the estimated condition(s), that is, the estimated power consumption level, the temperature, or both. As also described above, the controller 202, 252 may output the estimated condition(s) on an output device 232, 262 or to a computing device (not shown) over the network 234. The estimated condition(s) may aid visual representation of the one or more detected conditions and may be used as input to various control schemes.

At step 460, the controller 202, 252 may determine whether the method 400 is to continue. If a "no" condition is reached at step 460, the method 400 may end as indicated at step 470. The controller 202, 252 may determine that the method 400 is to end, for instance, following a predetermined length of time, following a predetermined number of iterations, manually discontinued, etc. If a "yes" condition is reached at step 460, the method 400 may continue beginning at step 430. In addition, steps 430-460 may be repeated substantially continuously. The method 400 may also continue beginning at step 420 in situations where the models correlating the utilization metric and power consumption and/or temperature of the electronic device 120 may be varied. In this case, for instance, steps 420-460 may be repeated substantially continuously following step 410, until a "no" condition is reached at step 460.

Although the method 400 has been described as pertaining to the estimation of a condition for an electronic device 120, it should be understood that the method 400 may be implemented to estimate conditions for any number of electronic devices 120. In this regard, for instance, the conditions of a plurality of electronic devices 120 may be summed to produce an aggregate condition for the plurality of electronic devices 120.

The operations set forth in the method 400 may be contained as a utility, program, or subprogram, in any desired computer accessible medium. In addition, the method 400 may be embodied by a computer program, which may exist in a variety of forms both active and inactive. For example, it can exist as software program(s) comprised of program instructions in source code, object code, executable code or other formats. Any of the above can be embodied on a computer readable medium, which include storage devices and signals, in compressed or uncompressed form.

Exemplary computer readable storage devices include conventional computer system RAM, ROM, EPROM, EEPROM, and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that any electronic device capable of executing the above-described functions may perform those functions enumerated above.

Figure 5:
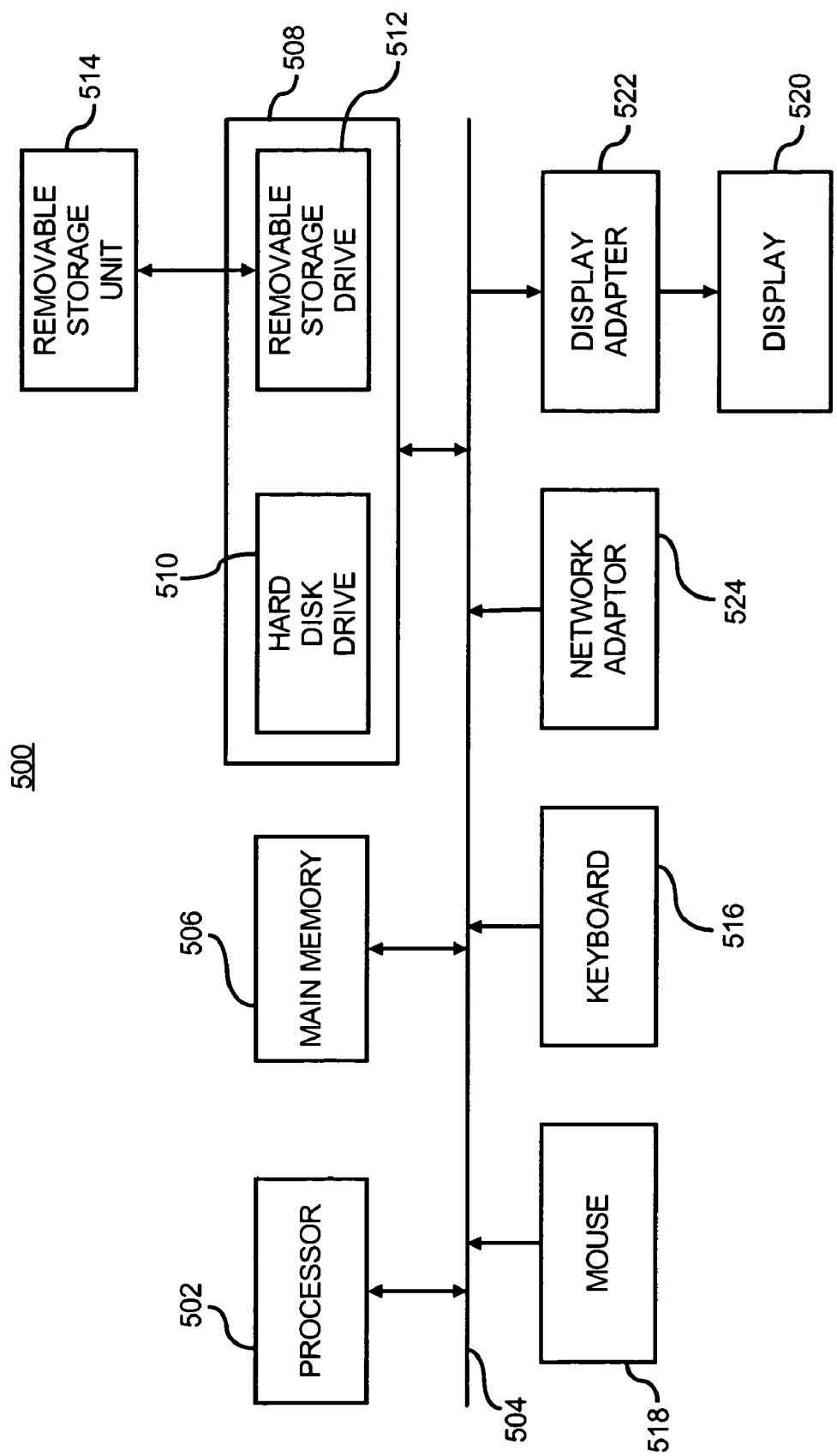
FIG. 5 illustrates a computer system, which may be employed to perform various functions described herein, according to an embodiment of the invention.

FIG. 5 illustrates a computer system 500, which may be employed to perform the various functions of the electronic device 120 and the computing device 250 described herein above, according to an example. In this respect, the computer system 500 may be used as a platform for executing one or more of the functions described hereinabove with respect to the controllers 202, 252.

The computer system 500 includes a processor 502, which may be used to execute some or all of the steps described in the method 400, and thus may comprise the controllers 202, 252. Commands and data from the processor 502 are communicated over a communication bus 504, which may comprise the buses 206, 256. The computer system 500 also includes a main memory 506, such as a random access memory (RAM), where the program code for, for instance, the controllers 202, 252, may be executed during runtime, and a secondary memory 508. The main memory 506 may comprise the memory 208. In addition, the secondary memory 508 includes, for example, one or more hard disk drives 510 and/or a removable storage drive 512, representing a floppy diskette drive, a magnetic tape drive, a compact disk drive, etc., where a copy of the program code for the estimation of one or more electronic device 120 conditions may be stored.

The removable storage drive 510 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor 502 may communicate over a network, for instance, the network 234, which may comprise the Internet, LAN, etc., through a network adaptor 524.

It will be apparent to one of ordinary skill in the art that other known electronic components may be added or substituted in the computer system 500. In addition, the computer system 500 may include a system board or blade used in a rack in a data center, a conventional "white box" server or computing device, etc. Also, one or more of the components in FIG. 5 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for estimating a condition of an electronic device, said method comprising:
   identifying a nonlinear relationship between at least one utilization metric of a component of the electronic device and the condition of a component to be estimated, wherein the condition comprises at least one of a power consumption level and a temperature of the component;
   formulating a linear model correlating the at least one utilization metric of the component of the electrical device and the at least one of the power consumption level and the temperature of the component to be estimated from the nonlinear relationship;
   detecting the at least one utilization metric of the component;
   estimating the at least one of the power consumption level and the temperature of the component based upon the formulated model with the detected at least one utilization metric as an input to the formulated model, and
   estimating at least one of a power consumption level and a temperature of the electronic device from the estimated at least one of the power consumption level and the temperature of the component.

2. The method according to claim 1, wherein formulating the linear model further comprises:
   determining trends in the nonlinear relationships between the at least one utilization metric and the at least one power consumption level and the temperature of the component to be estimated; and
   formulating the linear model based upon the trends in the nonlinear relationship.

3. The method according to claim 1, wherein detecting the at least one utilization metric further comprises detecting the at least one utilization metric with at least one of equipment and software originally supplied with the component of the electronic device.

4. The method according to claim 1, wherein detecting the at least one utilization metric comprises detecting at least one of CPU utilization, memory utilization, disk traffic, and network traffic.

5. The method according to claim 1, wherein the component comprises a processor having multiple power states, and wherein formulating the linear model further comprises utilizing a different weighting factor for each of the multiple power states, wherein the different weighting factors define the linear model from the nonlinear relationship between the at least one utilization metric and the at least one of the power consumption and the temperature of the processor.

6. The method according to claim 1, wherein the component comprises a disk drive, and wherein the at least one utilization metric comprises a data transfer rate of the disk drive, and wherein estimating the condition further comprises estimating at east one of a power consumption level and a temperature of the disk drive.

7. The method according to claim 1, further comprising:
   identifying nonlinear relationships between a plurality of utilization metrics of a plurality of components of the electronic device and the at least one of power consumption levels and temperatures of the plurality of components to be estimated;
   formulating linear models correlating the plurality of utilization metrics of a plurality of components to be estimated;
   detecting the plurality of utilization metrics for the plurality of components;
   estimating at least one of the power consumption levels and the temperatures of the plurality of components based upon the formulated models with the detected plurality of utilization metrics as inputs to the formulated models; and
   summing the estimated at least one of the power consumption levels and the temperatures of the plurality of components to estimate the at least one of the power consumption level and the temperature of the electronic device.

8. The method according to claim 1, wherein the electronic device comprises a blade server, and wherein estimating the at least one of the power consumption level and the temperature of the electronic device further comprises estimating at least one of a power consumption level and a temperature of the blade server.

9. The method according to claim 8, wherein the blade server comprises a plurality of processors, each of said plurality of processors having multiple power states, said method further comprising:

formulating a linear model for each of the plurality of processors utilizing different weighting factors for each of the multiple power states, wherein the different weighting factors define a linear model from the nonlinear relationships between each of the at least one utilization metric and at least one of a power consumption level and a temperature of each of the processors.

10. A computer implemented system for estimating a condition of an electronic device, said system comprising:

a module for identifying a nonlinear relationship between at least one utilization metric of a component of the electronic device and the condition of a component to be estimated, wherein the condition comprises at least one of a power consumption level and a temperature of the components;

a module for formulating a linear model correlating the at least one utilization metric and the at least one of the power consumption level and the temperature of the component to be estimated from the nonlinear relationship;

a module for estimating the at least one of the power consumption level and the temperature of the component;

at least one of equipment and software for detecting the at least one utilization metric, wherein the at least one of the equipment and the software is originally supplied with the component of the electronic; and a controller for implementing the linear model formulation module to formulate the linear model, and wherein the controller is further configured to implement the module for estimating the at least one of the power consumption level and the temperature of the component based upon the formulated linear model with the at least one utilization metric detected by the at least one of equipment and software for monitoring as an input to the formulation model, and wherein the controller is further configured to estimate at least one of a power consumption level and a temperature of the electronic device from the estimated at least one of the power consumption level and the temperature of the component.

11. The system according to claim 10, wherein the controller is further configured to implement the correlation determination module to determine trends in correlations between the at least one utilization metric and the at least one of the power consumption level and the temperature of the component to be estimated and to formulate the linear model based upon the determined trends.

12. The system according to claim 10, wherein the at least one utilization metric comprises at least one of CPU utilization, memory utilization, disk traffic, and network traffic.

13. The system according to claim 10, wherein the module for estimating the condition comprises at least one of a power consumption estimation module and a temperature estimation module.

14. The system according to claim 10, wherein the module for estimating the condition comprises a module for estimating power consumption and wherein the controller is further configured to implement the module for estimating power consumption to estimate the power consumption level of the component.

15. The system according to claim 10, wherein the module for estimating the condition comprises a module for estimating temperature and wherein the controller is further configured to implement the module for estimating temperature to estimate the temperature of the component.

16. The system according to claim 10, wherein the component comprises a processor of the electronic device, wherein the process has multiple power states, and wherein the controller is configured to implement the linear model formulating module to utilize different weighting factors for each of the multiple power states, wherein the different weighting factors define the linear model from the nonlinear relationship between the at least one utilization metric and the at least one of a power consumption level and a temperature of the processor.

17. The system according to claim 16, wherein the at least one utilization metric comprises load on the processor.

18. The system according to claim 10, wherein the component comprises a memory of the electronic device, and wherein the controller is configured to estimate at least one of a power consumption level and a temperature of the processor.

19. The system according to claim 18, wherein the at least one utilization metric comprises a data transfer rate of the disk drive.

20. A computer program product embodied on a computer-readable medium and comprising code that, when executed, causes a computer to perform the following:

identifying a nonlinear relationship between at least one utilization metric of a component of the electrical device and the condition of a component to be estimated, wherein the condition comprises at least one of a power consumption level and a temperature of the component;

formulating a linear model correlating the at least one utilization metric of the component of the electronic device and the at least one of the power consumption level and the temperature of the component to be estimated from the nonlinear relationship;

detecting the at least one utilization metric of the component with at least one of equipment and software originally supplied with the component;

estimating the at least one of the power consumption level and the temperature of the component based upon the formulated model with the detected at least one utilization metric as an input to the formulated model; and estimating at least one of a power consumption and a temperature of the electronic device from the estimated at least one of the power consumption level and the temperature of the component.

* * * * *

UNITED STATES PATENT AND TRADEMARK OFFICE
CERTIFICATE OF CORRECTION

PATENT NO. : 7,349,828 B1
APPLICATION NO. : 11/354446
DATED : March 25, 2008
INVENTOR(S) : Parthasarathy Ranganathan et al.

It is certified that error appears in the above-identified patent and that said Letters Patent is hereby corrected as shown below:

In column 11, line 60, in Claim 1, delete "electrical" and insert -- electronic --, therefor.

In column 12, line 12, in Claim 2, insert -- of the -- before "power".

In column 12, line 15, in Claim 2, delete "relationship" and insert -- relationships --, therefor.

In column 12, line 33, in Claim 5, after "consumption" insert -- level --.

In column 12, line 38, in Claim 6, delete "east" and insert -- least --, therefor.

In column 12, line 47, in Claim 7, after "components" insert -- of the electronic device and conditions of the plurality of components --.

In column 14, line 14, in Claim 16, delete "process" and insert -- processor --, therefor.

In column 14, line 36, in Claim 20, delete "electrical" and insert -- electronic --, therefor.

In column 14, line 54, in Claim 20, after "consumption" insert -- level --.

Signed and Sealed this

Twenty-ninth Day of June, 2010

David J. Kappos
*Director of the United States Patent and Trademark Office*